(12) United States Patent
Yamami et al.

(10) Patent No.: US 10,196,028 B2
(45) Date of Patent: Feb. 5, 2019

(54) STEERING WHEEL

(71) Applicant: NIHON PLAST CO., LTD., Fujinomiya-shi, Shizuoka (JP)

(72) Inventors: Akihiko Yamami, Fujinomiya (JP); Yohei Kiuchi, Fujinomiya (JP); Yuta Inaba, Fujinomiya (JP); Takashi Mitobe, Fujinomiya (JP)

(73) Assignee: NIHON PLAST CO., LTD., Fujinomiya-Shi, Shizuoka (JP)

( * ) Notice: Subject to any disclaimer, the term of this patent is extended or adjusted under 35 U.S.C. 154(b) by 34 days.

(21) Appl. No.: 15/473,394

(22) Filed: Mar. 29, 2017

(65) Prior Publication Data

US 2017/0282835 A1  Oct. 5, 2017

(30) Foreign Application Priority Data

Mar. 29, 2016 (JP) .................................. 2016-065561

(51) Int. Cl.
| | |
|---|---|
| *B60R 21/203* | (2006.01) |
| *B62D 1/04* | (2006.01) |
| *B60R 21/2165* | (2011.01) |
| *B60R 21/2342* | (2011.01) |
| *B60R 21/00* | (2006.01) |

(52) U.S. Cl.
CPC .... *B60R 21/2037* (2013.01); *B60R 21/21656* (2013.01); *B60R 21/2342* (2013.01); *B62D 1/04* (2013.01); *B60R 2021/0004* (2013.01)

(58) Field of Classification Search
CPC ........ B60R 21/21658; B60R 21/21656; B60R 21/2037
See application file for complete search history.

(56) References Cited

U.S. PATENT DOCUMENTS

| | | | | |
|---|---|---|---|---|
| 3,078,064 A | * | 2/1963 | Turnbull | F16B 19/1081 248/222.12 |
| 5,303,952 A | * | 4/1994 | Shermetaro | B60Q 1/0082 200/61.55 |
| 5,382,046 A | * | 1/1995 | Cuevas | B60R 21/2035 280/728.2 |

(Continued)

FOREIGN PATENT DOCUMENTS

| | | | |
|---|---|---|---|
| JP | 2001063588 A | * | 3/2001 |
| JP | 2011-148478 A | | 8/2011 |
| JP | 2015096375 A | * | 5/2015 |

*Primary Examiner* — Nicole T Verley
(74) *Attorney, Agent, or Firm* — Procopio, Cory, Hargreaves & Savitch LLP

(57) ABSTRACT

A steering wheel includes a steering wheel body including at least two insertion openings, and an airbag module including at least two hooks inserted into the insertion openings. The hooks are held by wires so that the airbag module is supported by the steering wheel body. Either the at least two hooks or the at least two insertion holes are provided with adjustment ribs which come into contact with the other ones of the at least two hooks and the at least two openings, thereby regulating the positions of the other ones, so as to receive the weight of the airbag module applied to the steering wheel body. Accordingly, a decrease in positioning performance of the airbag module is prevented, so as to regulate the position of the airbag module in the steering wheel body with high accuracy.

3 Claims, 6 Drawing Sheets

(56) References Cited

U.S. PATENT DOCUMENTS

| | | | | |
|---|---|---|---|---|
| 5,590,900 A * | 1/1997 | Duran | B60R 21/2035 | 24/453 |
| 5,775,725 A * | 7/1998 | Hodac | B60Q 5/003 | 280/728.2 |
| 5,931,492 A * | 8/1999 | Mueller | B60R 21/2037 | 200/61.55 |
| 6,010,148 A * | 1/2000 | Leonelli, Jr. | B60Q 5/003 | 200/61.54 |
| 6,036,223 A * | 3/2000 | Worrell | B60R 21/2035 | 280/728.2 |
| 6,457,379 B1 * | 10/2002 | Mirone | B60Q 5/003 | 200/61.54 |
| 6,881,911 B2 * | 4/2005 | Sugimoto | B60Q 5/003 | 200/61.54 |
| 7,422,236 B2 * | 9/2008 | Worrell | B60R 21/2037 | 280/731 |
| 7,490,852 B2 * | 2/2009 | Marotzke | B60Q 5/003 | 280/731 |
| 7,641,222 B2 * | 1/2010 | Schramm | B60R 21/21656 | 280/728.2 |
| 7,963,554 B2 * | 6/2011 | Nakagawa | B60R 21/2037 | 200/61.54 |
| 7,976,059 B2 * | 7/2011 | Fujita | B60R 21/2037 | 200/61.54 |
| 8,042,830 B2 * | 10/2011 | Hagelgans | B60R 21/2035 | 280/728.2 |
| 8,087,691 B2 * | 1/2012 | Nebel | B60R 21/2037 | 200/61.55 |
| 8,256,797 B2 * | 9/2012 | Sakurai | B60R 21/2037 | 200/61.55 |
| 8,336,911 B2 * | 12/2012 | Hondier | B60Q 5/003 | 280/731 |
| 8,342,567 B2 * | 1/2013 | Sasaki | B60R 21/2037 | 200/61.55 |
| 8,448,982 B2 * | 5/2013 | Yamaji | B60R 21/2037 | 280/728.2 |
| 8,500,156 B2 * | 8/2013 | Banno | B60R 21/2037 | 280/728.2 |
| 8,511,707 B2 * | 8/2013 | Amamori | B60R 21/2035 | 280/728.2 |
| 8,720,942 B2 * | 5/2014 | Onohara | B60R 21/2037 | 200/61.55 |
| 8,733,203 B2 * | 5/2014 | Kondo | B60Q 5/003 | 280/731 |
| 8,794,662 B2 * | 8/2014 | Ishii | B60R 21/2037 | 280/728.2 |
| 8,919,812 B2 * | 12/2014 | Schutz | B60R 21/2037 | 280/728.2 |
| 8,939,466 B2 * | 1/2015 | James | B60R 21/20 | 280/731 |
| 8,955,876 B2 * | 2/2015 | Strecker | B60R 21/2037 | 280/731 |
| 8,985,623 B2 * | 3/2015 | Kondo | B60R 21/2037 | 280/731 |
| 9,061,650 B2 * | 6/2015 | Ko | B60R 21/21656 | |
| 9,139,150 B2 * | 9/2015 | Oh | B60R 21/2037 | |
| 9,403,552 B2 * | 8/2016 | Onohara | B60R 21/2037 | |
| 9,550,525 B2 * | 1/2017 | Ishii | B60Q 5/003 | |
| 9,580,034 B2 * | 2/2017 | Saito | B60R 21/2037 | |
| 9,592,783 B2 * | 3/2017 | Nebel | B60R 21/2037 | |
| 2012/0306184 A1 * | 12/2012 | Yamaji | B60R 21/2037 | 280/731 |
| 2017/0144594 A1 * | 5/2017 | Obayashi | B60Q 5/003 | |

\* cited by examiner

STEERING WHEEL

CROSS-REFERENCE TO RELATED APPLICATION

This application claims the benefit of priority from Japanese Patent Application No. 2016-065561, filed on Mar. 29, 2016, the entire contents of which are incorporated herein by reference.

BACKGROUND OF THE INVENTION

Field of the Invention

The present invention relates to a steering wheel of a vehicle equipped with an airbag module fixed to a steering wheel body with hooks inserted into holes and supported by engaging members.

Description of the Related Art

Steering wheels are known that are equipped with airbag modules attached to bosses (boss cores) serving as support members composing steering wheel bodies. An airbag module includes a folded airbag, an inflator for supplying gas to the airbag, a base plate to which the airbag and the inflator is attached, and a cover connected to the base plate to cover the airbag and the inflator.

JP 2011-148478 discloses an airbag module attached to a boss with a single operation. In particular, the airbag module includes a case having a base plate provided with three penetration openings on both right and left sides and on the bottom side to which snap-lock springs (wires) serving as U-shaped engaging members are attached. The airbag module is fixed to the boss of a steering wheel body such that three hooks serving as engaged members provided in the boss of the steering wheel body are inserted into the penetration openings so as to be engaged with the snap-lock springs.

The airbag module is attached to the boss with a single operation such that the airbag module is positioned in the boss in the front-rear direction (in the thickness direction of the steering wheel) due to the engagement between the hooks and the snap-lock springs. However, the airbag module and the boss cannot be positioned accurately in the top-bottom and right-left directions (in the diameter directions of the steering wheel) only by the engagement between the hooks and the snap-lock springs. In order to accurately position the airbag module in the boss in the top-bottom and right-left directions, a plurality of (a pair of) positioning pins (locator pins) are further provided in the airbag module, in addition to the hooks. Each positioning pin is provided, at the circumferential surface, with a plurality of flexible projecting claws which are flexibly brought into contact with the inner surfaces of openings provided in the boss (refer to pages 5 to 8, and FIG. 2 of JP 2011-148478).

However, such positioning pins may fail to position the airbag module in the boss accurately because the flexible claw located on the lowest side (at the six o'clock position) when the pin is in a laid state may be weighed down with the own weight of the airbag module. Thus, it is desirable to improve positioning performance of an airbag module in a weighing direction with high accuracy.

SUMMARY OF THE INVENTION

The present invention has been made in view of the conventional problems. An object of the present invention is to provide a steering wheel with a structure capable of regulating a position of an airbag module in a steering wheel body with high accuracy.

A steering wheel according to the present invention includes: a steering wheel body; an airbag module; at least two openings provided in one of the steering wheel body and the airbag module; at least two hooks provided in another one of the steering wheel body and the airbag module and inserted into the openings; and at least two engaging members engaging with and holding the hooks inserted into the openings so that the airbag module is supported by the steering wheel body, one of each hook and each opening including a positioning reference portion configured to come into contact with another one of each hook and each opening, thereby regulating a position of the other one, so as to receive a weight of the airbag module applied to the steering wheel body.

DESCRIPTION OF THE EMBODIMENTS

Hereinafter, an embodiment of the present invention will be described with reference to the drawings.

Figure 7:
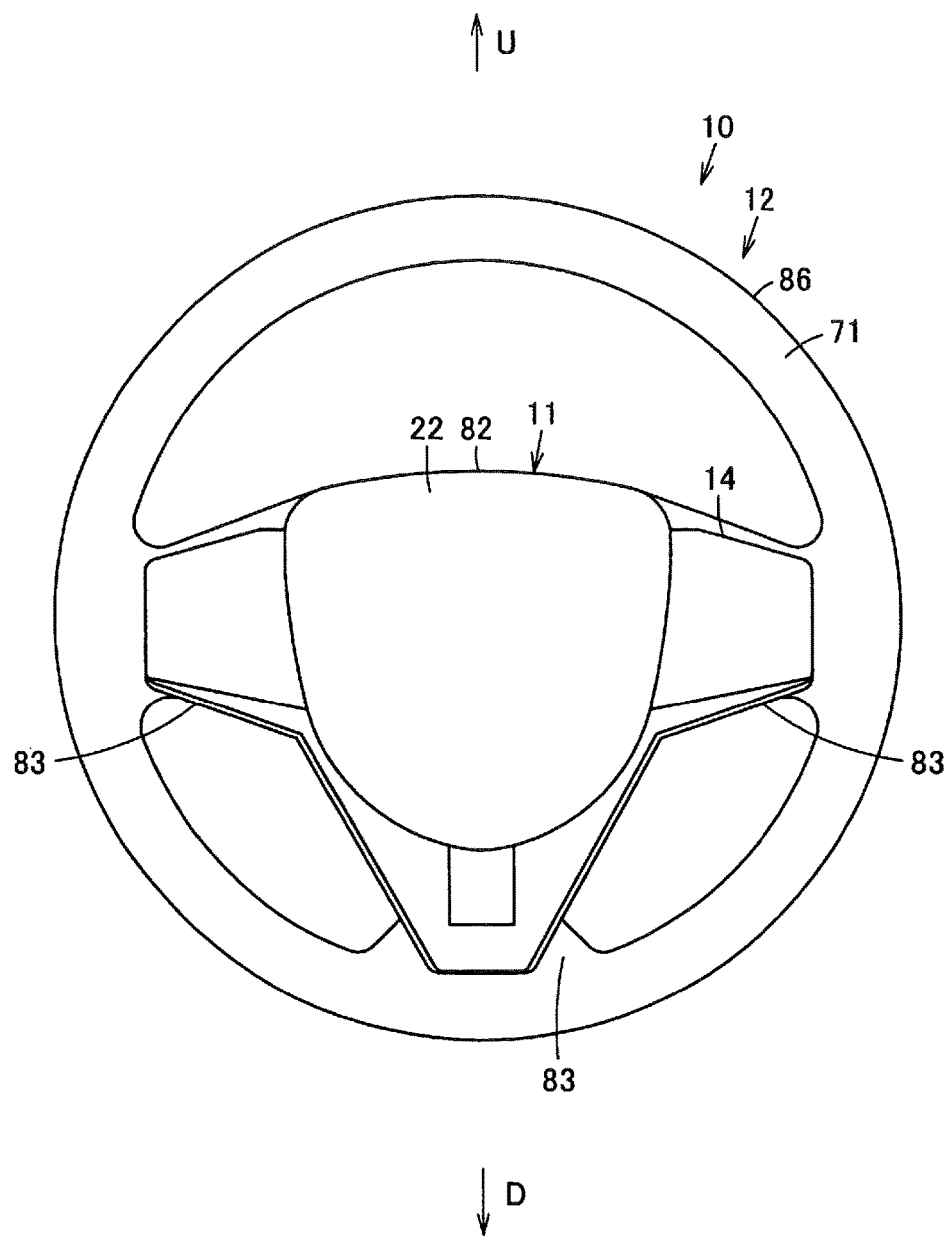
FIG. 7 is a front view of the steering wheel according to the embodiment of the present invention.

FIG. 7 illustrates a steering wheel 10 as a component used in a motor vehicle. The steering wheel 10 is located in front of a driver's seat in the motor vehicle. The steering wheel 10 includes an airbag module 11, a steering wheel body 12 in which the airbag module is installed on the driver's seat side, a cover 13 as a covering member attached to the steering wheel body 12 on the opposite side of the driver's seat, namely on the opposite side of the airbag module 11, and a finisher (a garnish) 14 as a decorative member attached to the steering wheel body 12 on the driver's seat side. The airbag module 11 is removably engaged with and supported by the steering wheel body 12 via wires 16 as engaging members. The wires 16 are supported by support members 17 provided in either the airbag module 11 or the steering wheel body 12. The present embodiment exemplifies a case in which the wires 16 are supported by the support members 17 provided in the steering wheel body 12.

The steering wheel 10 is fixed to a steering shaft as a steering device (not shown) commonly installed in an inclined state with respect to the horizontal direction (or the vertical direction). As used herein, the airbag module side is referred to as a driver's side, a front side, or a vehicle-rearward side (in the direction indicated by arrow R in FIG. 6), the steering shaft side is referred to as a vehicle body side, a back side, or a vehicle-forward side (in the direction indicated by arrow F in FIG. 6), and a direction along the steering shaft is referred to as an axial direction. The present embodiment will further illustrate various directions such as a front-rear direction (indicated by arrows F and R) and a top-bottom direction (indicated by arrows U and D shown in FIG. 1, for example) on the basis of forward movement of the vehicle equipped with the steering wheel 10.

The airbag module 11 includes a case 24 as a housing member, an inflator 25 placed in the case 24, and a retainer 26. The case 24 includes a base plate 21 as an attachment member, an airbag cover 22 as a cover body, and an airbag 23 folded and house in the case 24.

Figure 3:
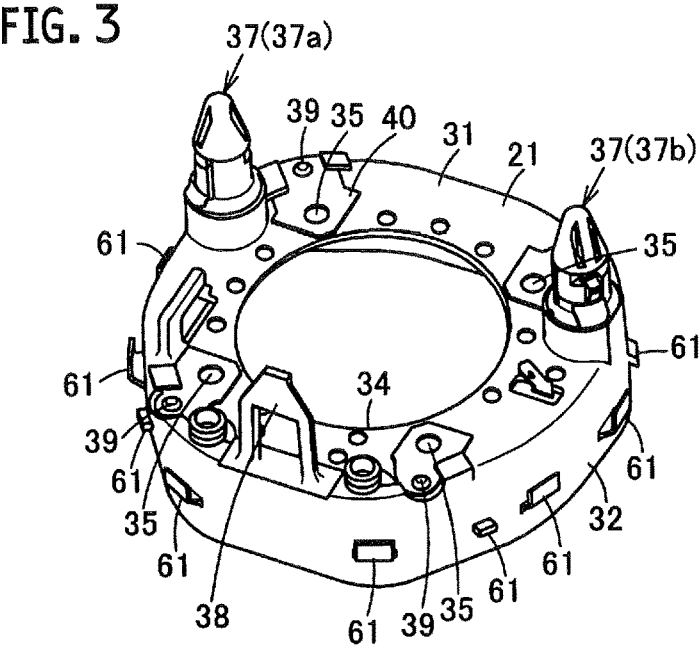
FIG. 3 is a perspective view partly illustrating an airbag module in the steering wheel according to the embodiment of the present invention.

The base plate 21 shown in FIG. 3 is also referred to as a back plate and a back holder integrally molded by injection molding with synthetic polymer, and also serves as a horn plate for a horn assembly (not shown). The base plate 21 includes a base 31 as an attachment surface of a case body, and a peripheral wall 32 extending along the entire circumference of the base 31 on the front side.

The base 31 includes an inflator attachment opening 34 having a circular shape and open substantially in the middle, and four attachment holes 35 along the inflator attachment opening 34. The base 31 also includes a pair of column-shaped (cylindrical) hooks 37 as engaged members projecting on the back side for detachably attaching the airbag module 11 to the steering wheel body 12 shown in FIG. 6. The base 31 also includes a lock member 38 projecting on the back side for detachably attaching the airbag module 11 to the steering wheel body 12. The base 31 also includes electrically conductive plates 40 including movable contacts 39 and integrally molded and buried in the base 31.

Figure 4:
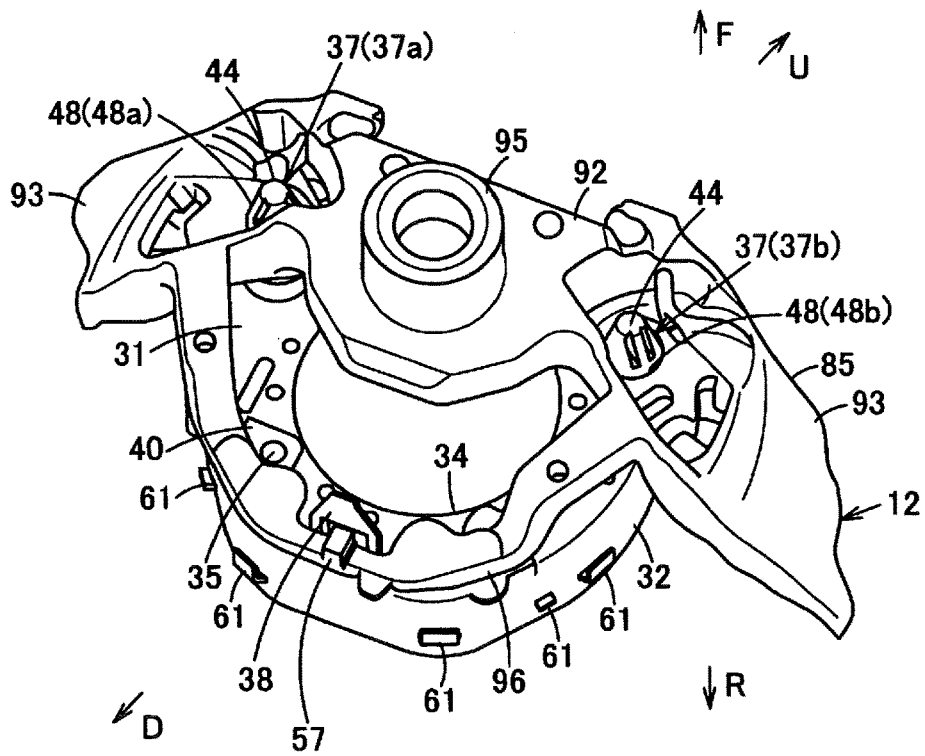
FIG. 4 is a perspective view partly illustrating the airbag module attached to a steering wheel body of the steering wheel according to the embodiment of the present invention.
Figure 5A:
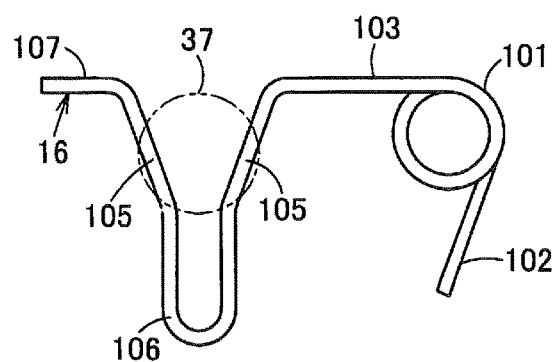
FIG. 5A is a plan view illustrating an engagement between an engaging member and an engaged member.

The respective hooks 37 serve as a guide for removably attaching the airbag module 11 to the steering wheel body 12, and positioning and guiding the airbag module 11 into the steering wheel body 12 in the front-rear direction. As shown in FIG. 2A and FIG. 2B, the hooks 37 each include a cylindrical receiver 42 located on the bottom side and projecting from the base 31, a cylindrical hook body 43 having a smaller diameter than the receiver 42 and concentrically extending from the receiver 42, and a cone-shaped insert part 44 concentrically provided at the tip of the hook body 43. The receiver 42, the hook body 43, and the insert part 44 are integrated together. Each hook 37 also includes at least one adjustment rib 46 serving as a positioning reference portion, and at least one adjustment hook 47 serving as an adjuster. The hook body 43 and the insert part 44 of each hook 37 are inserted in the front-rear direction (in the vehicle-forward direction) into an insertion opening 48 provided in the steering wheel body 12, as described below, as shown in FIG. 4. Each hook 37 is elastically fixed and held by the wire 16 shown in FIG. 5 attached to each insertion opening 48. One end (the rear end) of a horn spring 49 which is a coil spring as biasing means shown in FIG. 6 is held on each hook 37 so as to bias the airbag module 11 against the steering wheel body 12 in the vehicle-rearward direction (toward the driver). In the present embodiment, the hooks 37 include a (first) hook 37a shown in FIG. 1A and a (second) hook 37b shown in FIG. 1B arranged separately from each other on the upper right and left sides of the base plate 21 (the base 31) of the airbag module 11 in the right-left direction (in the three o'clock-to-nine o'clock direction) when the steering wheel 10 is in neutral.

The receiver 42 holds one end (the rear end) of the horn spring 49 shown in FIG. 6, and is provided with a plurality of lock claws 51 protruding in the radial direction for locking the horn spring 49.

The other end (the front end) of the horn spring 49 shown in FIG. 6 is located at the periphery of the hook body 43 on the bottom side toward the receiver 42. The hook body 43 includes the insert part 44 located closer to the tip than the other end of the horn spring 49 and inserted into the insertion opening 48 in the steering wheel 12. A circumferential surface 52 of the hook body 43 which is an outer surface of the hook 37 is not brought into contact with the inner surface of the insertion opening 48. The circumferential surface 52 includes a recess 53 to which the wire 16 shown in FIG. 6 is fixed, the recess being located toward the bottom of the insert part 44.

The insert part 44 is gradually reduced in diameter toward the tip from the bottom on the hook body 43 side so that the hook 37 is easily inserted into the insertion opening 48.

The adjustment rib 46 regulates the position of the hook 37 when coming into contact with the inner surface of the insertion opening 48 so as to serve as a reference for positioning the airbag module 11 in the steering wheel body 12, and receives the weight (load) of the airbag module 11 applied to the steering wheel body 12 so as to prevent the airbag module 11 from being weighed down with its own weight. The adjustment rib 46 is a nondeforming member (a rigid member) not elastically deformed when coming into contact with the inner surface of the insertion opening 48. The adjustment rib 46 is elongated on the circumferential surface 52 of the hook body 43 of the hook 37 in the axial direction, that is, the insertion direction of the hook 37 toward the insertion opening 48, and protrudes on the circumferential surface of the hook body 43 in the direction vertical to the axial direction (along the radial direction of the hook body 43). The adjustment rib 46 keeps the contact with the inner surface of the insertion opening 48 when the airbag module 11 moves toward the steering wheel body 12 in the front-rear direction due to the operation of the horn assembly, for example. The adjustment rib 46 is designed such that the length in the longitudinal direction (in the axial direction) is greater than the protrusion from the circumferential surface 52 of the hook body 42 along the radial direction. The adjustment rib 46 protrudes into a substantially semicircular shape in cross section along the radial direction. The adjustment rib 46 is located on the lower side of the hook 37, that is, at the six o'clock position of the hook 37 in cross section. The hook 37a is provided with a (first) adjustment rib 46a, and the hook 37b is provided with a (second) adjustment rib 46b.

Figure 1A:
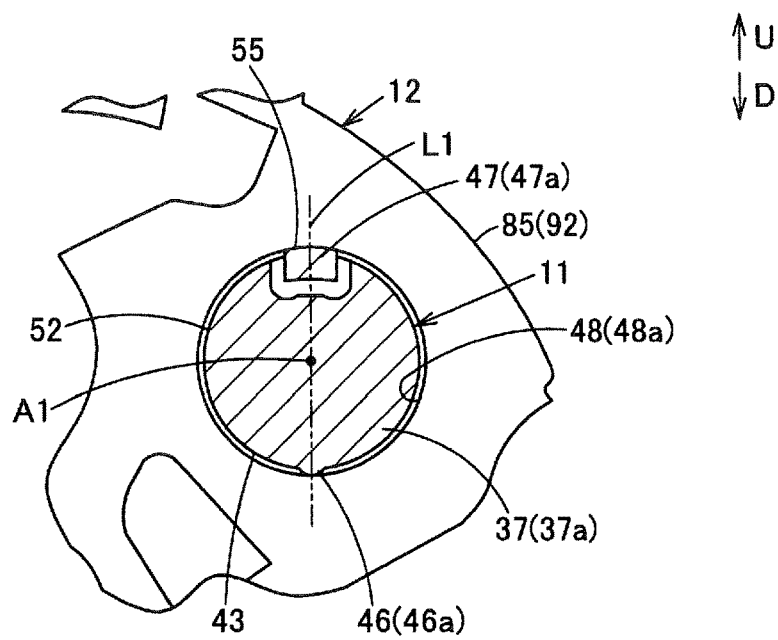
FIG. 1A is a cross-sectional view of one hook in a steering wheel according to an embodiment of the present invention.
Figure 2A:
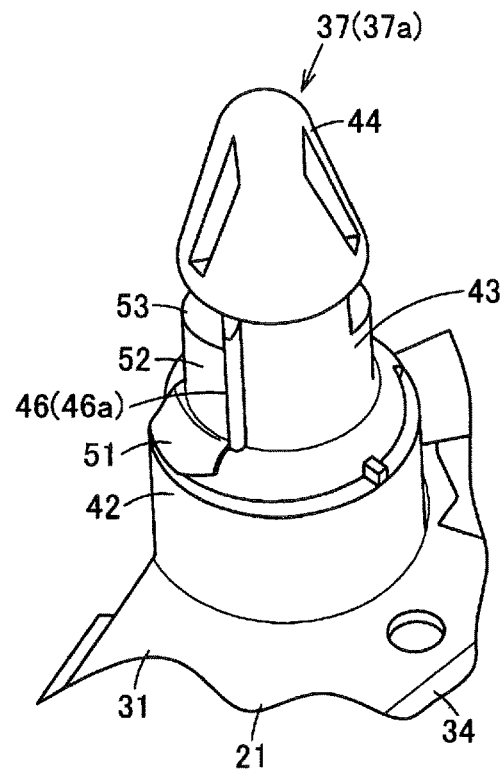
FIG. 2A is a perspective view of one hook in the steering wheel according to the embodiment of the present invention.
Figure 2B:
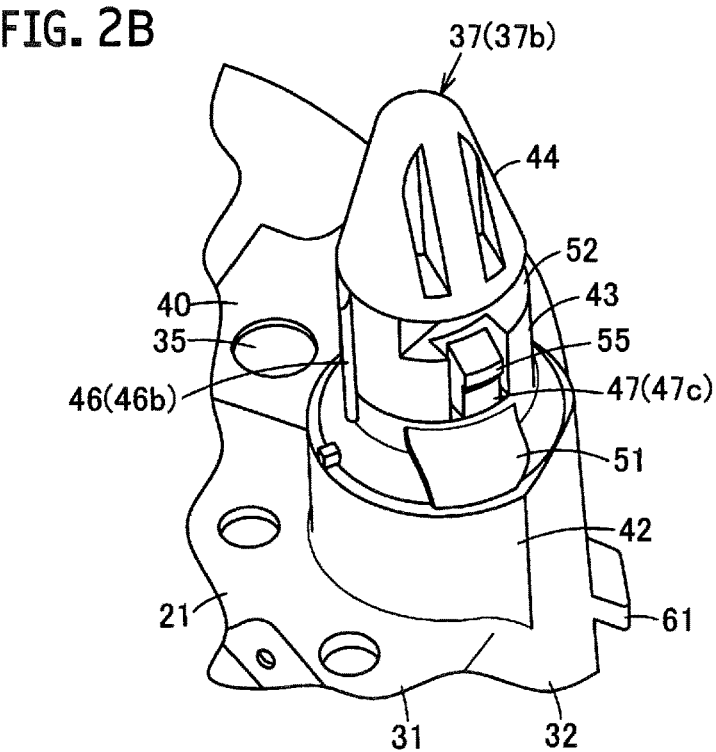
FIG. 2B is a perspective view of another hook in the steering wheel according to the embodiment of the present invention.

As shown in FIG. 1A, the adjustment rib 46a is located at the bottom of the hook 37a in cross section. In other words, the adjustment rib 46a (the middle of the adjustment rib 46a) is located at an intersection of the virtual line L1 in the top-bottom direction orthogonal to the central axis A1 of the hook 37a and the circumferential surface 52 of the hook body 43 of the hook 37a on the lower side.

Figure 1B:
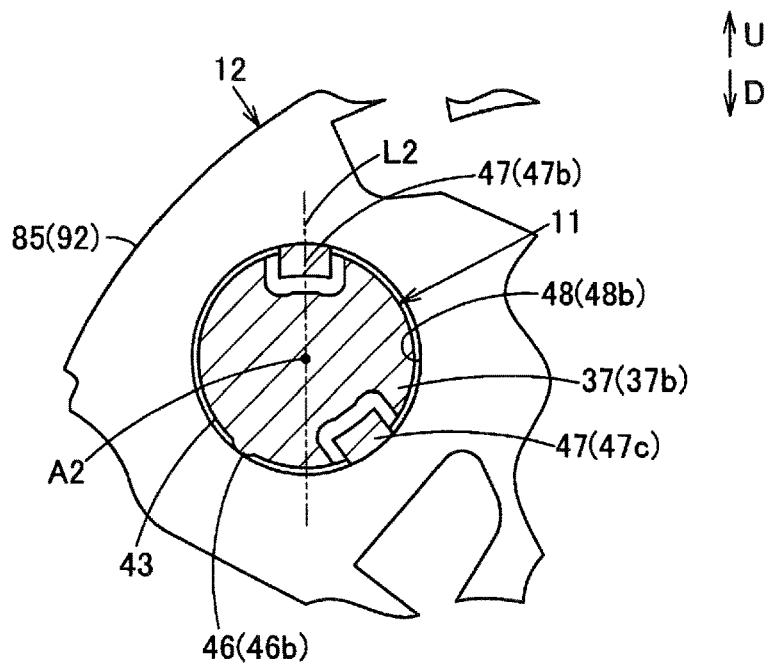
FIG. 1B is a cross-sectional view of another hook in the steering wheel according to the embodiment of the present invention.

As shown in FIG. 1B, the adjustment rib 46b is located on the lower circumference of the hook 37b in cross section, which is a lower arc within a predetermined acute central angle, such as 60°, on the respective right and left sides of the bottom. More particularly, the adjustment rib 46b (the middle of the adjustment rib 46b) is located on the lower arc within the central angle of 60° (the total central angle of 120°) on the right and left sides of the virtual line L2 in the top-bottom direction orthogonal to the central axis A2 of the hook 37b, namely, located between the four o'clock position to the eight o'clock position. In the present embodiment, the adjustment rib 46b is located on the lower side of the hook 37b at a predetermined angle and on the right side as viewed from the driver's side (on the left in FIG. 1B), namely, on the hook 37a side toward the center of the base plate 21 in the right-left direction.

The adjustment hook 47 adjusts the position of the hook 37 in the insertion opening 48, so as to place the airbag module 11 in a predetermined initial position (a centering position) in the steering wheel body 12. As shown in FIG. 2B, the adjustment hook 47 is located closer to the bottom side of the hook body 43 than the recess 53, and the tip of the adjustment hook 47 is located at the same level as the recess 53. The adjustment hook 47 has a tongue-like shape and is elastically deformable in the direction orthogonal to the axis (along the radial direction) of the hook body 43 of the hook 37, and includes a contact claw 55 at the tip thereof protruding outward from the circumferential surface 52 of the hook body 43 in the direction orthogonal to the axis. The contact claw 55 of the adjustment hook 47 elastically comes into contact with the inner surface of the insertion opening 48 as shown in FIG. 1A and FIG. 1B. The adjustment hook 47 is designed to constantly press strongly against the insertion opening 48 (with the contact claw 55), and is biased against the insertion opening 48 in the radial direction of the hook 37 at a predetermined load, which is approximately one and a half times as much as the weight of the airbag module 11 in the present embodiment. The hook 37a includes a (first) adjustment hook 47a as shown in FIG. 1A, and the hook 37b includes a pair of (second) adjustment hooks 47b and 47c as shown in FIG. 1B.

The adjustment hook 47a shown in FIG. 1A is located at a position different from the adjustment rib 46a on the circumferential surface 52 of the hook body 43 of the hook 37a. In the present embodiment, the adjustment hook 47a is located at the top of the hook 37a in cross section. In other words, the adjustment hook 47a (the middle of the adjustment hook 47a) is located at an intersection of the virtual line L1 in the top-bottom direction orthogonal to the central axis A1 of the hook 37a and the circumferential surface 52 of the hook body 43 of the hook 37a on the upper side. The adjustment hook 47a is thus located on the opposite side of the adjustment rib 46a on the circumferential surface 52 on the basis of the central axis A1. Namely, the adjustment hook 47a and the adjustment rib 46a are aligned in the top-bottom direction along the virtual line L1 in cross section.

The adjustment hooks 47b and 47c shown in FIG. 1B are located at positions different from the adjustment rib 46b on the circumferential surface 52 of the hook body 43 of the hook 37b. In the present embodiment, in cross section, the adjustment hook 47b is located at the top of the hook 37b, and the adjustment hook 47c is located on the lower side of the hook 37b. In other words, the adjustment hook 47b (the middle of the adjustment hook 47b) is located at an intersection of the virtual line L2 in the top-bottom direction orthogonal to the central axis A2 of the hook 37b and the circumferential surface 52 of the hook body 43 of the hook 37b on the upper side. The adjustment hook 47c (the middle of the adjustment hook 47c) is located at a position different from the adjustment rib 46b on the lower arc within the central angle of 60° (the total central angle of 120°) on the respective right and left sides of the virtual line L2 in the top-bottom direction orthogonal to the central axis A2 of the hook 37b. In the present embodiment, the adjustment hook 47c (the middle of the adjustment hook 47c) is located on the opposite side of the adjustment rib 46b on the basis of the virtual line L2. The adjustment hook 47c and the adjustment rib 46b are thus located at substantially the same distance from the adjustment hook 47b. The adjustment hooks 47b and 47c and the adjustment rib 46b are located at the apexes of a virtual symmetrical isosceles triangle in which the central axis A2 is a centroid.

The lock member 38 shown in FIG. 4 is locked in a lock receiver 57 serving as a claw in the front-rear direction, which is the insertion direction of the hook 37 toward the insertion opening 48, the lock receiver 57 being provided on the steering wheel body 12 side, as described below. In particular, the lock member 38 prevents the airbag module 11 from coming off in the front direction, prevents unsteadiness of the airbag module 11 attached to the steering wheel body 12, and improves operability of the horn assembly via the airbag module 11. The lock member 38 is formed into a loop (U-shape) on the base 31 and projects on the back side of the base 31 in the vehicle-forward direction. The lock member 38 is located in the lower middle of the base plate 21 (the base 31) of the airbag module 11 in the right-left direction, that is, at the six o'clock position when the steering wheel 10 shown in FIG. 7 is in neutral. The hooks 37 (the hooks 37a and 37b) and the lock member 38 are located at different positions and at the apexes of a virtual symmetrical isosceles triangle as viewed from the front.

The movable contacts 39 shown in FIG. 3 are opposed to fixed contacts 59, as described below, for a horn mechanism provided in the steering wheel body 12 as shown in FIG. 6, and compose a horn switch together with the fixed contacts 59.

The electrically conductive plates 40 are made of electrically conductive metal material. The electrically conductive plates 40 may be fixed to the base 31 with claws, or may be molded together with the base plate 21 by insert molding and buried in the base 31 excluding the movable contacts 39.

The airbag 23 is folded and housed inside the circumferential wall 32 as shown in FIG. 6. The circumferential wall 32 extends in the deployment direction of the airbag 23. The circumferential wall 32 includes a plurality of engaged portions 61 along the base 31 for holding the airbag cover 22 by engagement. Although the present embodiment illustrates the engaged portions 61 having a hook-like shape, the engaged portions 61 may be openings, or may be both hooks and openings.

The airbag cover 22 shown in FIG. 6 is integrally molded with insulating synthetic resin. The airbag cover 22 includes a surface plate 63 as a cover body covering part of the steering wheel 10 on the front side, and an attachment plate 64 projecting downward into a square case in the vehicle-forward direction from the back surface of the surface plate 63.

The surface plate 63 is provided on the rear surface with a tear seam with a substantially H-shape as viewed from the front serving as a split-expected groove (a fragile portion) (not shown) reduced in thickness at a position surrounded by the attachment plate 64. The surface plate 63 splits along the tear seam due to airbag deployment pressure at the time of inflation of the airbag.

The attachment plate 64 is placed outside the circumferential wall 32 of the base plate 21, and conforms to the outline of the circumferential wall 32. The attachment plate 64 includes engagement holes 65 engaged with the engaged portions 61 on the base plate 21.

The airbag 23 is formed into a flat sack-like shape made of a piece of or pieces of base cloth (for illustration purposes, FIG. 6 illustrates only part of a base cloth panel including an attachment portion and omits other elements). The airbag 23 includes a circular inflator attachment opening 66, and four attachment holes 67 (FIG. 6 shows only three holes) along the circumference of the inflator attachment opening 66, as in the case of the base 31 of the base plate 21.

The inflator 25 includes a disk-like inflator body 71, and a flange 72 extending outward from the inflator body 71. The inflator body 71 includes a gas jet port (not shown), and the flange 72 includes four attachment holes 74 (FIG. 6 shows only three holes). The inflator body 71 further includes contacts (not shown) on the bottom thereof. The contacts are connected with a wire harness via connectors (not shown), so that the inflator 25 is electrically connected to a controller via the wire harness.

The retainer 26 includes a ring-like retainer base 76 made of a metal plate, and four attachment bolts 77 (FIG. 6 shows only three bolts) fixed to the retainer base 76. The retainer base 76 includes a circular inflator attachment opening 78 in the middle thereof. The attachment bolts 77 extend on the back side and surround the inflator attachment opening 78. Nuts (not shown) are screwed on the attachment bolts 77.

The retainer 26 is placed in the airbag 23, and the airbag 23 is folded into a predetermined shape with the attachment bolts 77 of the retainer 26 inserted into the attachment holes 67. The folded airbag 23 is covered with the airbag cover 22 while the engagement holes 65 of the attachment plate 64 of the airbag cover 22 are aligned with the engaged portions 61 on the circumferential wall 32 of the base plate 21, and the attachment bolts 77 of the retainer 25 are inserted and pushed into the attachment holes 35 of the base plate 21. Accordingly, the engagement holes 65 and the engaged portions 61 are engaged, so that the airbag cover 22 and the base plate 21 are fixed together with a single operation (snap-in).

The inflator 25 is then attached to the base plate 21 from the back side while the attachment bolts 77 projecting from the base plate 21 on the back surface are inserted into the attachment holes 74, and the nuts are then screwed on the attachment bolts 77 so as to be fastened together. At the same time, the front portion of the inflator body 71 provided with the gas jet port in the inflator 25 is inserted in the airbag 23 through the inflator attachment hole 34, so as to complete the airbag module 11.

The steering wheel body 12 includes a circular rim portion (a ring-like portion) 81, a boss portion (a mount portion) 82 as a hub located inside the rim portion 81, and a plurality of (three in the present embodiment) spokes 83 connecting the rim portion 81 and the boss portion 82.

The steering wheel body 12 further includes a core 85 made of metal, and a covering member 86 shown in FIG. 7 made of a soft material and integrally covering part of the core 85. The back side of the core 85 is covered with the cover 13.

The core 85 includes a rim core 91, a boss core 92 as a support member of a steering wheel body attachment portion (a hub core), and spoke cores 93 as connection members, corresponding to the rim portion 81, the boss portion 82, and the two spokes 83, respectively. The core 85 is obtained by die casting with a metal mold (not shown). The other one spoke 83 is composed of the airbag module 11 or the finisher 14, for example. The present embodiment is thus applicable to both the steering wheel 10 including three spokes 83 and the steering wheel 10 including two spokes 83 by varying the configurations of the airbag module 11 or the finisher 14.

The boss core 92 is also referred to as a boss plate, and integrated in the middle with a cylindrical boss 95 to which the steering shaft is inserted. The boss core 92 is provided with the insertion openings 48, and the fixed contacts 59 composing the horn switch. The boss core 92 includes at the bottom with a loop-shaped (U-shaped) projection receiver 96 provided with the lock receiver 57 and some of the fixed contacts 59.

The insertion openings 48 penetrate the boss core 92 in the front-rear direction, namely, in the thickness direction, and have a circular shape. The inside of each insertion opening 48 is formed into a cylindrical shape having a substantially even surface without roughness, with which the adjustment rib 46 and the adjustment hook 47 come into contact. The insertion openings 48 are located at positions corresponding to the respective hooks 37 separately from each other on both right and left sides at the upper portion of the boss core 92 (adjacent to the base ends of the spoke cores 93). In the present embodiment, the insertion openings 48 include a (first) insertion opening 48a corresponding to the hook 37a and a (second) insertion opening 48b corresponding to the hook 37b. The insertion openings 48a and 48b are arranged separately from each other on the upper right and left sides of the base plate 21 (the base 31) of the airbag module 11 in the right-left direction (in the three o'clock-to-nine o'clock direction) when the steering wheel 10 is in neutral.

The claw-like lock receiver 57 projects from the lower middle in the right-left direction of the boss core 92 (the projection receiver 96) at a position corresponding to the lock member 38. The lock receiver 57 receives the lock member 38 in the front-rear direction which is the insertion direction of the hooks 37, so as to lock up the lock member 38 to prevent the movement toward the front side, as shown in FIG. 5C.

The fixed contacts 59 are electrically conductive metal members, and correspond to the movable contacts 39 on the airbag module 11 side shown in FIG. 3.

The cover 13 shown in FIG. 6 is also referred to as a body cover and a lower cover, and is made of synthetic polymer, for example, to cover the rear surface of the boss portion 82 (excluding the boss 95) and the rear surfaces of the respective spokes 83. The cover 13 is provided with insertion holes 98 to which a jig such as an L-shaped hook for releasing the engagement between the hook 37 and the wire 16 is inserted.

The respective wires 16 may also be referred to as a one touch wire, and are made of elastically deformable metal wire material (piano wire). In the present embodiment, the wires 16 are twisted coil springs, as shown in FIG. 5A, each including a coil portion 101 wound in a coil, a first arm 102 extending straight from one end of the coil portion 101 along a line tangent to the coil, and a second arm 103 extending straight from the other end of the coil portion 101 along a line tangent to the coil and making an acute angle with the first arm 102. The respective wires 16 are placed on the back side of the steering wheel body 12 (the boss core 92 (the boss portion 82)), namely, on the vehicle-forward side. The wires 16 are provided symmetrically on both right and left sides, and only one of the wires 16 is described in detail below.

The coil portion 101 causes an elastic restoring force. In particular, when the wires 16 are applied with a biasing load such that the angle between the first arm 102 and the second arm 103 is changed from a natural state (no-load state), the wires 16 then restore the biased state to the natural state. The first arm 102 is set shorter than the second arm 103. The first arm 102 is a fixed portion fixed to the steering wheel body 12 (the boss core 92 (the boss portion 82)) so as not to move.

The second arm 103 is a movable portion (a slidable portion) movable (slidable) with respect to the steering wheel body 12 (the boss core 92 (the boss portion 82)) in the direction intersecting (substantially perpendicular to) the vehicle-forward direction which is the attachment direction of the airbag module 11 toward the steering wheel body 12. The movement (sliding) of the second arm 103 switches between an engagement with the hook 37 of the airbag module 11 and a release from the engagement. The second arm 103 includes catches 105, 105 as engaging members engaging with the recess 53 of the hook 37 of the airbag module 11 shown in FIG. 5B so as to lock the hook 37, a removal operating portion 106 as an engagement releasing portion connected to the catches 105, and a sliding guide portion 107 as a supported portion connected to the end of one of the catches 105.

The catches 105 extend in the direction substantially perpendicular to the longitudinal direction of the second arm 103. The respective catches 105 are separately located and connected to each other via the removal operating portion 106.

Figure 5B:
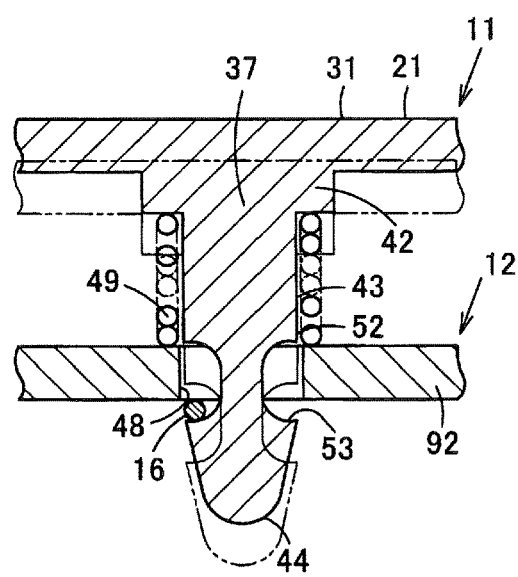
FIG. 5B is a cross-sectional view of FIG. 5A.
Figure 5C:
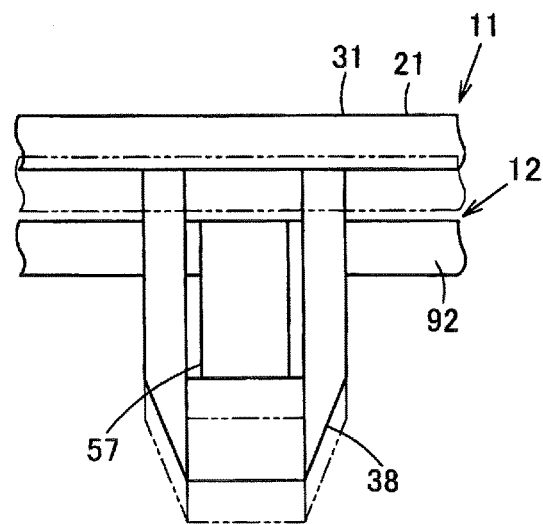
FIG. 5C is a side view of a lock member and a lock receiver in a locked state.
Figure 6:
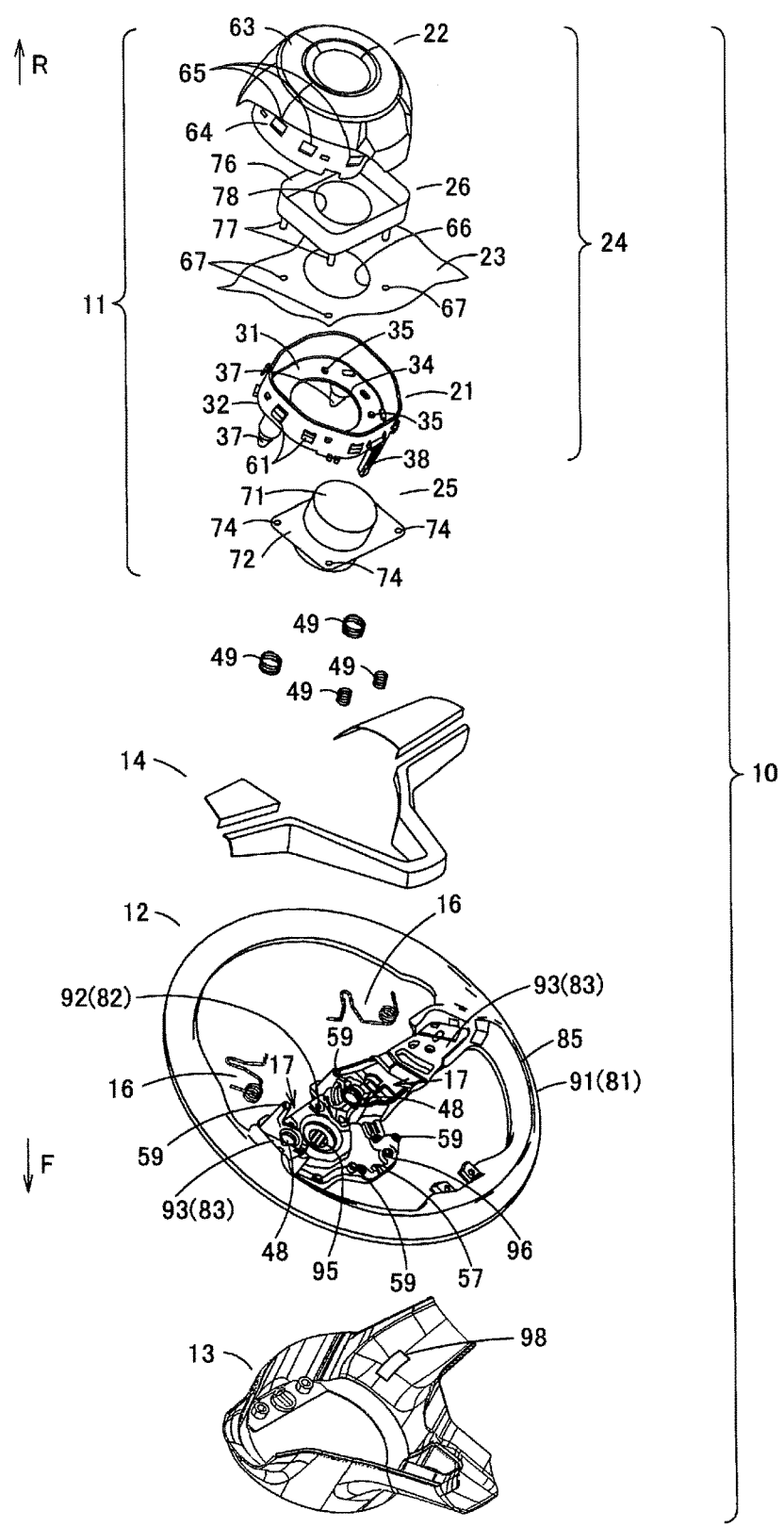
FIG. 6 is an exploded perspective view of the steering wheel according to the embodiment of the present invention.

The removal operating portion 106 has an arc-like shape on the tip side and protrudes outward from the hook 37 in a state where the catches 105 engage with the recess 53 of the hook 37 as shown in FIG. 5B. The wire 16 is bent from the tip of the second arm 103 such that the catches 105 and the removal operating portion 106 form a V-shape (U-shape), as shown in FIG. 5A.

The sliding guide portion 107 is connected to the end of one of the catches 105 and extends straight in the longitudinal direction of the second arm 103.

The support members 17 shown in FIG. 6 are located in the steering wheel body 12 (the boss core 92 (the boss portion 82)). The support members 17 regulate the positions of the wires 16 in such a manner as to fix the coil portions 101 and the first arms 102 and slidably support the second arm 103.

The steering wheel 10 shown in FIG. 6 is assembled such that the cover 13 is positioned and opposed to the rear surface of the steering wheel body 12 and then attached to the steering wheel body 12. Thereafter, the steering shaft is fitted to the boss 95 of the steering wheel body 12 and fastened together with a nut (not shown).

The airbag module 11 can be attached to the steering wheel body 12 with a single operation such that, while the lock member 38 is hooked on the lock receiver 57, the respective insertion openings 48 and the respective hooks 37 are positioned to face each other and pushed from the front side. More particularly, the hooks 37 located at the forefront, namely, projecting toward the boss core 92, are positioned and pushed toward the insertion openings 48 open on the steering wheel body 12, so that the hook bodies 43 are inserted to the insertion openings 48 while the insert parts 44 of the hooks 37 serve as a guide. At the same time, the adjustment ribs 46 (the adjustment ribs 46a and 46b) of the hooks 37 (the hooks 37a and 37b) slide on and come into contact with the lower inner surfaces of the insertion openings 48 (the insertion openings 48a and 48b) without bending, so that the airbag module 11 is positioned accurately with respect to the steering wheel body 12 in the top-bottom and right-left directions. In association with this positioning, the contact claws 55 of the adjustment hooks 47 (the adjustment hooks 47a, 47b, and 47c) coming into contact with the inner surfaces of the insertion openings 48 (the insertion openings 48a and 48b) are elastically deformed to adjust dimensional errors, and the release of the elastic deformation (spring back) returns the hooks 37 (the hooks 37a and 37b) toward the center of the insertion openings 48 (the insertion openings 48a and 48b), so as to adjust the position of the airbag module 11 with respect to the steering wheel body 12. Accordingly, the airbag module 11 is positioned in the steering wheel body 12. The insert parts 44 further push the catches 105 of the wires 16 on the back side of the insertion openings 48, so that the catches 105 rotate and slide on the central axes of the coil portions 101 to escape from the steering wheel body 12. Once the insert parts 44 pass through the catches 105 and the airbag module 11 is pushed to the end, the second arms 103 of the wires 16 recover due to the elastic restoring force of the coil portions 101, so that the catches 105 engage with the recesses 53 of the hooks 37. As a result, the airbag module 11 is engaged with the steering wheel body 12 at the three positions on both sides and on the lower side so as to be prevented from coming off.

In this state, the steering wheel body 12 is guided by the respective hooks 37 and the lock member 38 in the front-rear direction.

The contacts of the inflator 25 are then electrically wired, so as to complete the steering wheel 10 equipped with the airbag module 11 and attached to the steering shaft.

The steering wheel 10 as described above is operated during traveling by the driver holding and rotating the rim portion 81. When the driver pushes the airbag cover 22 of the airbag module 11 serving also as a pushing portion against the biasing load of the respective horn springs 49, the airbag module 11 is relatively guided forward due to the engagement between the hooks 37 and the insertion openings 48 and the engagement between the lock member 38 and the lock receiver 57, as shown in FIG. 5B and FIG. 5C, so that the movable contacts 39 come into contact with the fixed contacts 59 to sound the horn assembly on the body side. Since the adjustment ribs 46 and the adjustment hooks 47 come into contact with and slide on the insertion openings 48 having the substantially even inner surfaces without roughness, the airbag module 11 smoothly moves in the pushing direction.

In the event of head-on collision or impact, the inflator 25 rapidly supplies gas to the airbag 23, so that the airbag 23 folded and housed is immediately inflated. The inflation pressure of the airbag 23 then pushes and splits the airbag cover 22 along the tear seam to provide an opening for the airbag 23, and the airbag 23 is deployed toward the driver from the opening, so as to restrain and protect the driver. Since the hooks 37 are engaged with the wires 16, the airbag module 11 is continuously held by the steering wheel body 12 against the impact upon the deployment of the airbag 23.

When the airbag module 11 is removed from the steering wheel body 12, a jig such as an L-shaped hook (not shown) is hooked on the removal operating portion 106 and pulled in the direction opposite to the insertion direction of the hook 37 so as to remove the removal operating portion 106 from the recess 53. Accordingly, the engagement between the wire 16 and the hook 37 is released, so that the airbag module 11 is removed from the steering wheel body 12.

According to the present embodiment, the steering wheel body 12 includes a plurality of insertion openings 48, and the airbag module 11 includes a plurality of hooks 37. The hooks 37 are held by the wires 16, so that the airbag module 11 is supported by the steering wheel body 12. Either the at least two hooks 37 or the at least two insertion openings 48 (in the present embodiment, the hooks 37a and 37b) are brought into contact with the inner surfaces of the other ones (in the present embodiment, the insertion openings 48a and 48b), so as to regulate the positions. At the same time, the adjustment ribs 46 (the adjustment ribs 46a and 46b) receive the weight of the airbag module 11 applied to the steering wheel body 12, so as to prevent a decrease in positioning performance of the airbag module 11 and regulate the position of the airbag module 11 in the steering wheel body 12 with high accuracy.

More particularly, the nondeforming (rigid) adjustment ribs 46 (the adjustment ribs 46a and 46b) are located on the bottom side of the hooks 37 (the hooks 37a and 37b) in cross section to which the weight of the airbag module 11 is applied. Since the adjustment ribs 46 (the adjustment ribs 46a and 46b) in contact with the inner surfaces of the insertion openings 48 (the insertion openings 48a and 48b) are not deformed by the weight of the airbag module 11 in the state where the hooks 37 are inserted into the insertion openings 48, the airbag module 11 is supported on the bottom side by the reaction of the adjustment ribs 46 from the inner surfaces of the insertion openings 48. Accordingly, the airbag module 11 attached to the steering wheel body 12 is prevented from being weighed down with its own weight, so as to position the airbag module 11 in the steering wheel body 12 in the top-bottom direction with high accuracy.

Further, the adjustment hooks 47 (the adjustment hooks 47a and 47b) are provided on either the at least two hooks 37 or the at least two insertion openings 48 (in the present embodiment, on the hooks 37a and 37b) at the positions different from the adjustment ribs 46 (the adjustment ribs 46a and 46b), and elastically come into contact with the inner surfaces of the other ones (in the present embodiment, the insertion openings 48a and 48b) in association with the contact of the adjustment ribs 46. The elastic contact of the adjustment hooks 47 (the adjustment hooks 47a and 47b) with the insertion openings 48 (the insertion openings 48a and 48b) absorbs dimensional errors and pushes back the hooks 37 (the hooks 37a and 37b) by the reaction of the adjustment hooks 47 from the inner surfaces of the insertion openings 48, so as to adjust and regulate the position of the airbag module 11 with respect to the steering wheel body 12 with higher accuracy.

Since the insertion openings 48 (the insertion openings 48a and 48b) have the substantially even inner surfaces, the adjustment ribs 46 (the adjustment ribs 46a and 46b) and the adjustment hooks 47 (the adjustment hooks 47a and 47b) can smoothly come into contact with and slide on the inner surfaces of the insertion openings 48 when the airbag module 11 is pushed against the steering wheel body 12 to sound the horn assembly, so as to prevent a decrease in performance of the horn assembly.

Further, the respective adjustment ribs 46 (the adjustment ribs 46a and 46b) are located on the lower arc of either the at least two hooks 37 or the at least two insertion openings 48 (in the present embodiment, the hooks 37a and 37b) in cross section within the central angle of 60° on the respective right and left sides of the vertical line passing through the center. Accordingly, the adjustment ribs 46 (the adjustment ribs 46a and 46b) in contact with the inner surfaces of the other ones (in the present embodiment, the insertion openings 48a and 48b) can receive the weight of the airbag module 11 applied to the steering wheel body 12 effectively and accurately in the state where the hooks 37 are inserted into the insertion openings 48 in the front-rear direction, so as to regulate the position of the airbag module 11 with respect to the steering wheel body 12 with higher accuracy.

The lock receiver 57 provided in either the steering wheel body 12 or the airbag module 11 (in the present embodiment, the steering wheel body 12) receives and locks up the lock member 38 provided on the other one (in the present embodiment, the airbag module 11), so as to accurately position the airbag module 11 in the steering wheel body 12 at least at the three points of engagement between the two hooks 37 (the hooks 37a and 37b) and the two insertion openings 48 (the insertion openings 48a and 48b) and between the lock member 38 and the lock receiver 57.

The lock member 38 and the lock receiver 57 are engaged together in the insertion direction of the hooks 37 (the hooks 37a and 37b) toward the insertion openings 48 (the insertion openings 48a and 48b) (in the front-rear direction), so as to regulate the position of the lock member 38 by the lock receiver 57 in the right-left direction. Accordingly, the airbag module 11 is not prevented from moving toward the steering wheel body 12 in the front-rear direction when the airbag module 11 is pushed against the steering wheel body 12 to operate the horn assembly, while the positioning in the right-left direction is regulated with high accuracy. At the same time, the positional regulation in the right-left direction functions as a guide to allow the airbag module 11 to move in the front-rear direction smoothly.

In the present embodiment, the airbag module 11 may include three or more hooks 37 provided with the adjustment ribs 46 and the adjustment hooks 47. In that case, the number of the insertion openings 48 may correspond to that of the hooks 37 included.

When three hooks 37 is included, at least two hooks 37 are only required to be provided with the adjustment ribs 46 and the adjustment hooks 47 so as to exhibit the same functional effects as the present embodiment. In that case, the adjustment ribs 46 and the adjustment hooks 47 are preferably provided in the hooks 37 located on one side and the other side in the right-left direction, namely, on both right and left sides of the airbag module 11 (the base plate 21).

The adjustment ribs 46 and the adjustment hooks 47 may be provided in the insertion openings 48, instead of the hooks 37.

The steering wheel 10 may include two or four spokes 83, instead of three spokes 83.

The wires 16 may have any optional shape such as a U-shape.

The present embodiment exemplified the case in which the airbag module 11 (the base plate 21) is provided with the hooks 37, and the steering wheel body 12 (the boss core 92) is provided with the insertion openings 48 and the wires 16. Alternatively, the airbag module 11 (the base plate 21) may be provided with the insertion openings 48 and the wires 16, and the steering wheel body 12 (the boss core 92) may be provided with the hooks 37.

The lock member 38 may be provided in the steering wheel body 12, and the lock receiver 57 may be provided in the airbag module 11 (the base plate 21).

The airbag module 11 may be a pad housing a shock absorber. The configurations and effects of the steering wheel according to the present invention are described below.

The steering wheel according to the present invention includes: a steering wheel body; an airbag module; at least two openings provided in one of the steering wheel body and the airbag module; at least two hooks provided in the other one of the steering wheel body and the airbag module and inserted into the openings; and at least two engaging members engaging with and holding the hooks inserted into the openings so that the airbag module is supported by the steering wheel body. Either the at least two hooks or the at least two openings include positioning reference portions configured to come into contact with the other ones of the at least two hooks and the at least two openings, thereby regulating positions of the other ones, so as to receive a weight of the airbag module applied to the steering wheel body.

Since the steering wheel of the present invention includes the at least two openings, the at least two hooks inserted into the openings, and the at least two engaging members engaging with and holding the hooks so that the airbag module is supported by the steering wheel body, and either the at least two hooks or the at least two openings include the positioning reference portions configured to come into contact with the other ones of the at least two hooks and the at least two openings, thereby regulating positions of the other ones, so as to receive a weight of the airbag module applied to the steering wheel body, a decrease in positioning performance of the airbag module can be prevented, so as to regulate the position of the airbag module in the steering wheel body with high accuracy.

According to the steering wheel, either the at least two hooks or the at least two openings include the adjusters located at the positions different from the positioning reference portions and elastically coming into contact with the other ones of the at least two hooks and the at least two openings in association with the contact of the positioning reference portions.

Since either the at least two hooks or the at least two openings include the adjusters located at the positions different from the positioning reference portions and elastically coming into contact with the other ones of the at least two hooks and the at least two openings in association with the contact of the positioning reference portions, the elastic contact of the adjusters with the other ones absorbs dimensional errors and pushes back the hooks by the reaction of the adjusters from the inner surfaces of the openings, so as to adjust and regulate the position of the airbag module with respect to the steering wheel body with higher accuracy.

According to the steering wheel, each positioning reference portion is located on the lower arc of either the hook or the opening in cross section within the central angle of 60° on the respective right and left sides of the vertical line passing through the center.

Since each positioning reference portion is located on the lower arc of either the hook or the opening in cross section within the central angle of 60° on the respective right and left sides of the vertical line passing through the center, the positioning reference portion in contact with the inner surface of the other one of the hook and the opening can receive the weight of the airbag module applied to the steering wheel body effectively and accurately in the state where the hooks are inserted into the openings, so as to regulate the position of the airbag module with respect to the steering wheel body with higher accuracy.

The steering wheel further includes the lock receiver provided in either the steering wheel body or the airbag module, and the lock member provided on the other one of the steering wheel body and the airbag module and locked in the lock receiver.

The lock receiver provided in either the steering wheel body or the airbag module receives and locks up the lock member provided on the other one of the steering wheel body and the airbag module, so as to accurately position the airbag module in the steering wheel body at least at the three points of engagement between the at least two hooks and the at least two openings and between the lock member and the lock receiver.

The invention claimed:
1. A steering wheel comprising:
a steering wheel body;
an airbag module;
at least two openings provided in one of the steering wheel body and the airbag module;
at least two column-shaped hooks provided in another one of the steering wheel body and the airbag module and inserted into the openings; and
at least two engaging members engaging with and holding the hooks inserted into the openings so that the airbag module is supported by the steering wheel body,
wherein the hooks are arranged separately from each other on right and left sides in one of the steering wheel body and the airbag module, and
the openings are arranged separately from each other on the right and left sides in another one of the steering wheel body and the airbag module,
each hook includes a positioning reference portion configured to come into contact with each opening, thereby regulating a position of the opening, so as to receive a weight of the airbag module applied to the steering wheel body,
wherein the positioning reference portion in one of the hooks is located at the bottom of the hook in cross section, and
the positioning reference portion in the other of the hooks is located at a position different from the bottom of the hook in cross section, and located on a lower arc of the hook in cross section within a central angle of 60° on each of right and left sides of a vertical line passing through a center of the hook.
2. The steering wheel according to claim 1, wherein one of each hook and each opening includes an adjuster located at a position different from the positioning reference portion and elastically coming into contact with the other one of each hook and each opening in association with contact of the positioning reference portion with each opening.
3. The steering wheel according to claim 1, further comprising:
a lock receiver provided in one of the steering wheel body and the airbag module; and
a lock member provided on another one of the steering wheel body and the airbag module and locked in the lock receiver.

* * * * *